United States Patent
Meduri et al.

(10) Patent No.: US 7,870,546 B2
(45) Date of Patent: Jan. 11, 2011

(54) COLLABORATIVE CLASSLOADER SYSTEM AND METHOD

(75) Inventors: Subbarao K. Meduri, Apex, NC (US); Thomas Edward Musta, Rochester, MN (US); James Lee Van Oosten, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1319 days.

(21) Appl. No.: 11/348,772

(22) Filed: Feb. 7, 2006

(65) Prior Publication Data

US 2007/0198475 A1 Aug. 23, 2007

(51) Int. Cl.
*G06F 9/44* (2006.01)

(52) U.S. Cl. .................................................. 717/166

(58) Field of Classification Search .................. 717/116, 717/166, 177, 162, 165; 707/102, 104.1; 719/320, 328; 725/132
See application file for complete search history.

(56) References Cited

U.S. PATENT DOCUMENTS

2003/0121031 A1* 6/2003 Fraenkel et al. ............. 717/166

2007/0192818 A1* 8/2007 Bourges-Sevenier et al. ..... 725/132

OTHER PUBLICATIONS

Robert Hall, "An OSGI Implementation and Experience Report", Ieee CCNC 2004, p. 1-6 (OSGI_Hall.pdf).*
R. Hall, A Policy-Driven Class Loader to Support Deployment in Extensible Frameworks', LNCS 3083, 2004, pp. 81-96 (Policy-driven_Hall.pdf).*
OSGi Alliance, Research Index pp. 1-3 (OSGI_Research_index.pdf).*

* cited by examiner

*Primary Examiner*—Tuan Anh Vu
(74) *Attorney, Agent, or Firm*—Jeanine S. Ray-Yarletts; Law Office of Jim Boice

(57) ABSTRACT

Computer implemented method, system and computer program product for searching for a class in a data processing system having classloaders organized in both a classloader hierarchy and a classloader network. A computer implemented method for searching for a class in a data processing system having classloaders organized in both a classloader hierarchy and a classloader network includes receiving a request to load a class at a request receiving classloader in the classloader hierarchy. The request to load a class is forwarded to a gateway classloader in the classloader network, wherein the gateway classloader is also in the classloader hierarchy. The requested class is then searched for in the classloader network.

12 Claims, 5 Drawing Sheets

COLLABORATIVE CLASSLOADER SYSTEM AND METHOD

BACKGROUND OF THE INVENTION

1. Field of the Invention

The present invention relates generally to the data processing field, and more particularly, to a computer implemented method, system and computer program product to search for and locate classes in a data processing system having classloaders organized in both a classloader hierarchy and a classloader network.

2. Description of the Related Art

The Java language has traditionally supported classloader objects that are responsible for loading classes. The classloaders are usually organized in a hierarchical tree structure, i.e., in a parent-child relationship. Java Frameworks use classloaders as a way to isolate application classes from runtime classes.

The classloaders use a delegation mechanism to find and load classes and resources across the hierarchy. Most commonly, the delegation pattern is a parent-first delegation pattern which requires a child classloader to delegate a request to load a class to its parent before looking for the requested class within its own scope.

Recently, frameworks such as Open Services Gateway Initiative (OSGi) have been developed which provide additional Java modularity features by incorporating a network of classloaders in their architecture. OSGi framework defines a unit of modularization called "bundle". A bundle is comprised of Java classes and other resources which together provide function to end users. The OSGi runtime is responsible for loading the bundles. Bundles can hide packages from other bundles, as well as share packages among an exporter bundle and a importer bundle in a well-defined way. The OSGi runtime creates one classloader per bundle, and wires the classloaders together using bundle meta-data that defines class imports and exports. The result is a network of classloaders rather than the hierarchy of classloaders typically found in the Java framework.

Modularity features provided by a framework such as OSGi are beneficial for middleware software systems as they formalize dependencies and relationships between middleware component bundles, and allow for building a more dynamic system. Middleware systems rebasing on OSGi framework would also inherit its network centric (peer-to-peer) classloading model. In reality, however, such middleware systems are likely required to preserve the classloading behavior for their existing customer applications. This is normally achieved by ensuring that application classloaders continue to have visibility to runtime classes just as before when a classloading request is delegated to a parent (runtime) classloader. The difference, however, is that after rebasing on OSGi framework, runtime classloader hierarchy is replaced by a network of bundle classloaders. There is no longer a single parent classloader for the application classloaders.

It would, accordingly, be desirable to provide a mechanism that enables classloaders organized in a classloader hierarchy and classloaders organized in a classloader network to collaborate so as to provide effective classloading while maintaining backward compatibility with existing applications and libraries.

BRIEF SUMMARY OF THE INVENTION

The present invention provides a computer implemented method, system and computer program product for searching for a class in a data processing system having classloaders organized in both a classloader hierarchy and a classloader network. A computer implemented method for searching for a class in a data processing system having classloaders organized in both a classloader hierarchy and a classloader network includes receiving a request to load a class at a request receiving classloader in the classloader hierarchy. When an application requests to load a class, the request is delegated to a gateway classloader in the classloader hierarchy, wherein the gateway classloader is also part of a "bundle" that "dynamically imports" classes from other runtime bundles in the classloader network. The requested class is then searched for and located in the classloader network.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
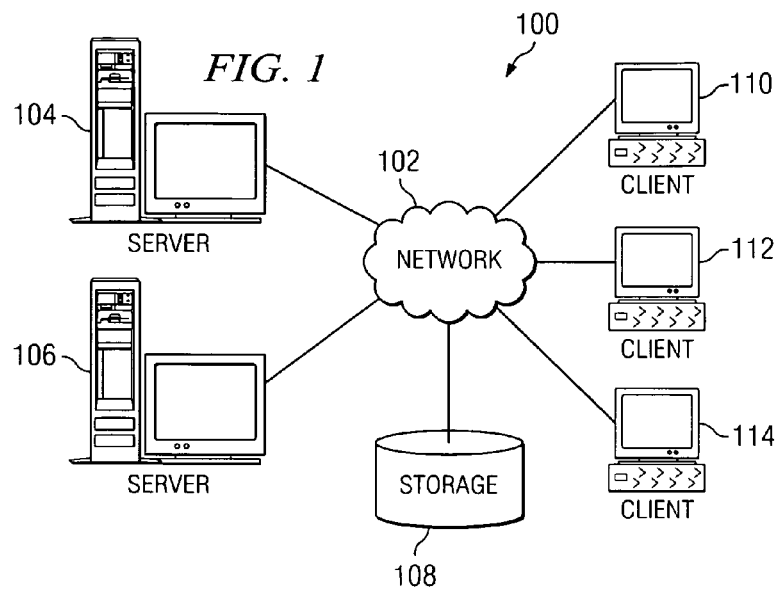
FIG. 1 depicts a pictorial representation of a network of data processing systems in which aspects of the present invention may be implemented.
Figure 2:
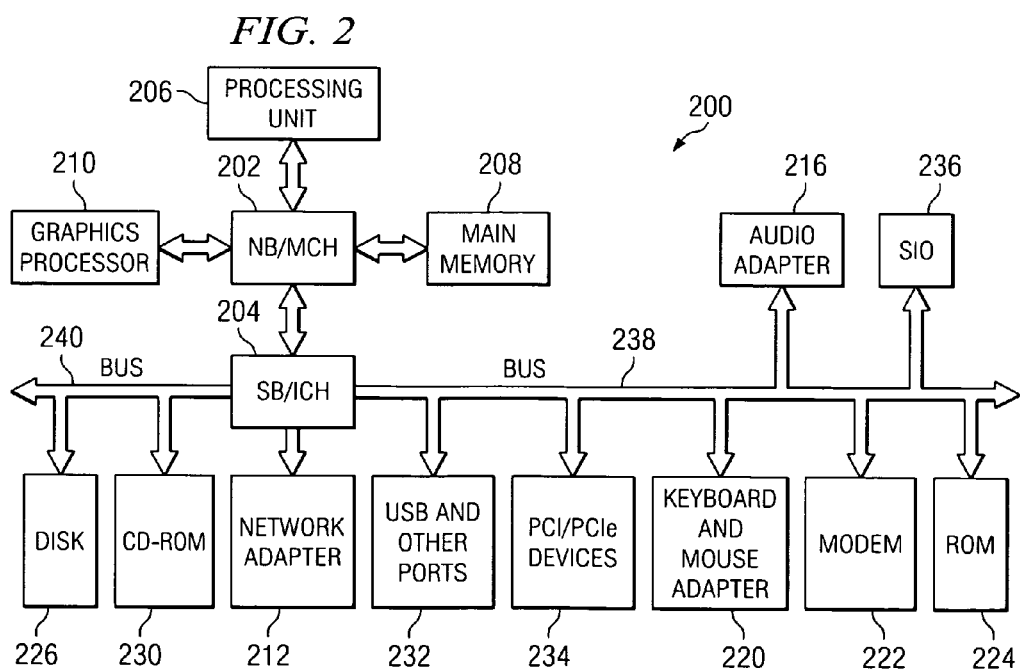
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
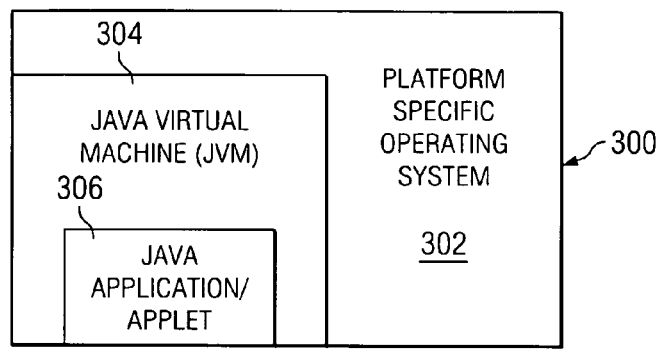
FIG. 3 is a block diagram that illustrates the relationship of software components operating within a computer system that may implement the present invention.

With reference now to FIG. 3, a block diagram that illustrates the relationship of software components operating within a computer system that may implement the present invention is depicted. Java-based system 300 contains platform specific operating system 302 that provides hardware and system support to software executing on a specific hardware platform. Java Virtual Machine (JVM) 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 described above with reference to FIG. 2. However, JVM 304 may be implemented in dedicated hardware on a so-called Java chip, Java-on-silicon, or Java processor with an embedded picoJava core.

At the center of a Java run-time environment is the JVM, which supports all aspects of the Java environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format, i.e., the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes are may be translated into native code by a just-in-time compiler or JIT.

A JVM loads class files and executes the bytecodes within them. The class files are loaded by a classloader in the JVM. The classloader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 4:
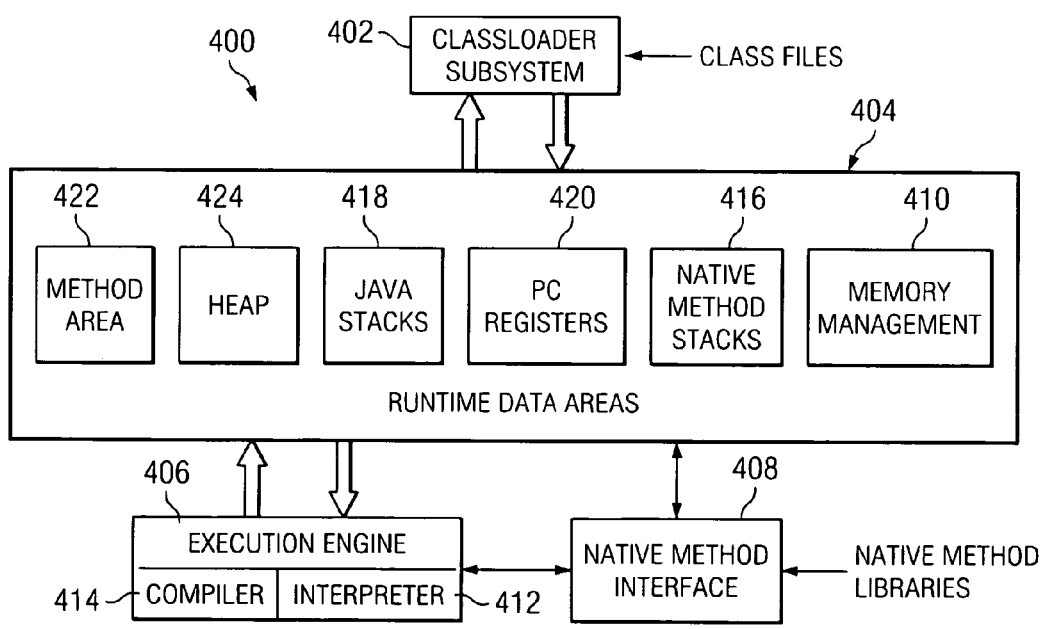
FIG. 4 is a block diagram that depicts a Java Virtual Machine in accordance with an exemplary embodiment of the present invention.

With reference now to FIG. 4, a block diagram of a JVM is depicted in accordance with an exemplary embodiment of the present invention. JVM 400 includes classloader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, the Java Native Interface (JNI).

Runtime data areas 404 contain native method stacks 416, Java stacks 418, PC registers 420, method area 422, and heap 424. These different data areas represent the organization of memory needed by JVM 400 to execute a program.

Java stacks 418 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

Program counter (PC) registers 420 are used to indicate the next instruction to be executed. Each instantiated thread gets its own PC register and Java stack. If the thread is executing a JVM method, the value of the PC register indicates the next instruction to execute. If the thread is executing a native method, then the contents of the PC register are undefined. Native method stacks 416 stores the state of invocations of native methods. The state of native method invocations is stored in an implementation-dependent way in native method stacks, registers, or other implementation-dependent memory areas. In some JVM implementations, native method stacks 416 and Java stacks 418 are combined.

Method area 422 contains class data while heap 424 contains all instantiated objects. The constant pool is located in method area 422 in these examples. The JVM specification strictly defines data types and operations. Most JVMs choose to have one method area and one heap, each of which are shared by all threads running inside the JVM, such as JVM 400. When JVM 400 loads a class file, it parses information about a type from the binary data contained in the class file. JVM 400 places this type of information into the method area. Each time a class instance or array is created, the memory for the new object is allocated from heap 424. JVM 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

Figure 5:
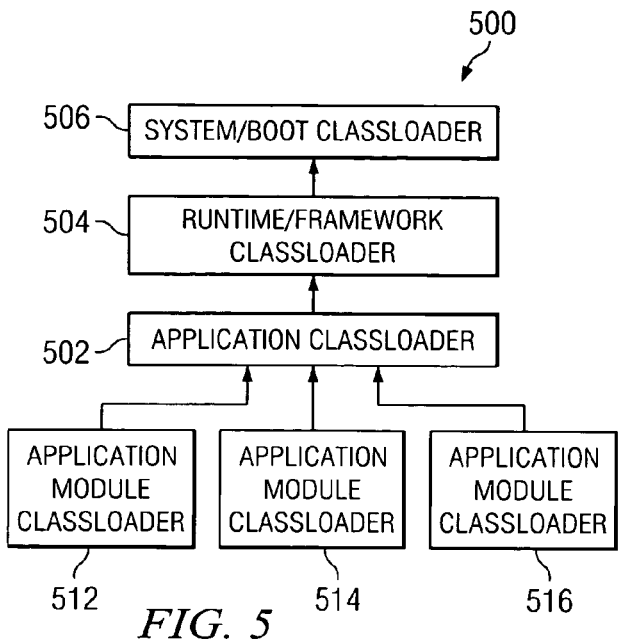
FIG. 5 is a block diagram that schematically illustrates a classloader architecture in the traditional Java framework to assist in explaining aspects of the present invention.

FIG. 5 is a block diagram that schematically illustrates a classloader architecture in the traditional Java framework to assist in explaining aspects of the present invention. The classloader architecture is generally designated by reference number 500, and may be implemented in classloader subsystem 402 in JVM 400 illustrated in FIG. 4.

As shown in FIG. 5, classloader architecture 500 comprises a hierarchical tree architecture in which classloaders are organized in a parent-child relationship. In the exemplary embodiment illustrated in FIG. 5, hierarchical architecture 500 includes classloaders 502, 504 and 506. Classloaders 502-506 include, in order from the bottom to the top of hierarchical tree 500: Application Classloader 502, Runtime/Framework Classloader 504 and System/Bootstrap Classloader 506. Although only one Application Classloader is shown in FIG. 5, other Application Classloaders can be included in the hierarchy as well. As additionally shown in FIG. 5, a plurality of Application Module classloaders, for example, Application Module classloaders 512, 514 and 516 may be included for modules that might be included in an application. It should be understood, however, that the classloaders and their order are intended to be exemplary only as hierarchical architecture 500 can include any number of classloaders arranged in any desired hierarchical manner.

In hierarchical architecture 500, classloader 502 at the bottom of the hierarchical tree is a child of classloader 504. Classloader 504 is both a parent of classloader 502 and a child of classloader 506. Classloader 506 is a parent of classloader 504 and is at the top of the hierarchy.

Classloader architecture 500 typically uses a delegation mechanism to find and load classes and resources across the hierarchy. Usually, the delegation mechanism is a parent-first delegation pattern that requires a child classloader to delegate a request to load a class to its parent classloader before looking for the class within its own scope. Thus, in the hierarchy illustrated in FIG. 5, when a request to load a class is received by Application classloader 502 from an application (or by one of module classloaders 512, 514, 516 from an application module, if present), it will forward the request up the hierarchy to the topmost classloader 506. Each classloader will look for the requested class, and either load the class if it is found, or return the request to its child classloader down to the Application module classloaders. If none of the classloaders are able to return the requested class, an error will be returned.

Recently, a framework referred to as Open Services Gateway Initiative (OSGi) framework has been developed which provides Java with additional modularity features including an ability to compartmentalize code to facilitate repair or replacement of a portion of code without affecting other potions of code. The OSGi framework, however, utilizes a classloader architecture that is different from the hierarchical classloader architecture used in the traditional Java framework. In particular, the OSGi framework utilizes classloaders that are not in a parent-child relationship but are peers to each other and are organized in a network architecture.

Figure 6:
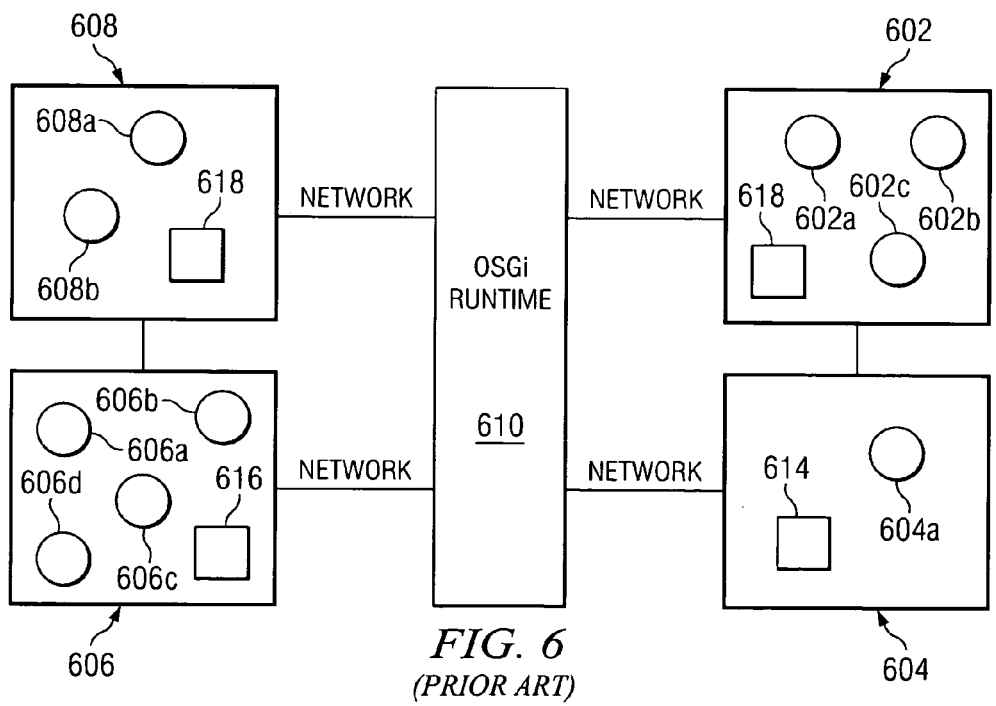
FIG. 6 is a diagram that schematically illustrates a classloader architecture in the traditional OSGi framework to assist in explaining aspects of the present invention.

FIG. 6 is a diagram that schematically illustrates a classloader architecture in the traditional OSGi framework to assist in explaining aspects of the present invention. The classloader architecture is generally designated by reference number 600, and comprises a network classloader architecture that includes a plurality of modules, generally referred to as "bundles", within which portions of code are packaged. Four bundles 602, 604, 606 and 608 are illustrated in FIG. 6, however, it should be understood that in practice, architecture 600 may include any number of bundles, and it is not intended to limit the invention to an architecture containing any particular number of bundles.

In network classloader architecture 600 built using the OSGi framework, each bundle 602-608 includes one or more classes and a classloader. In architecture 600, for example, bundle 602 includes three classes 602a-602c and classloader 612, bundle 604 includes one class 604a and classloader 614, bundle 606 includes four classes 606a-606d and classloader 616, and bundle 608 includes two classes 608a-608b and classloader 618. OSGi runtime 610 is responsible for loading bundles such as bundles 602 and 604 and establishing interactions between classloaders of each bundle.

OSGi runtime 610 also wires classloaders 602-608 together in a network using bundle meta-data that defines class imports and exports. The result is a network of classloaders by which meta-data about classes in the different bundles can be imported to or exported from the bundles as shown in FIG. 6.

The present invention provides a classloader system that adapts the network classloader architecture of the OSGi framework illustrated in FIG. 6 while preserving compatibility with existing customer applications and libraries that rely on the hierarchical tree classloader architecture of the Java framework illustrated in FIG. 5. In accordance with an exemplary embodiment of the present invention, a hybrid of these two classloading architectures is provided by which runtime classes are refactored into OSGi bundles and are loaded by a network of classloaders while preserving hierarchical application classloader structure to maintain backward compatibility. To achieve this, a mechanism has been provided to enable application classloaders to access and collaborate with a network of classloaders such as illustrated in FIG. 6.

Figure 7:
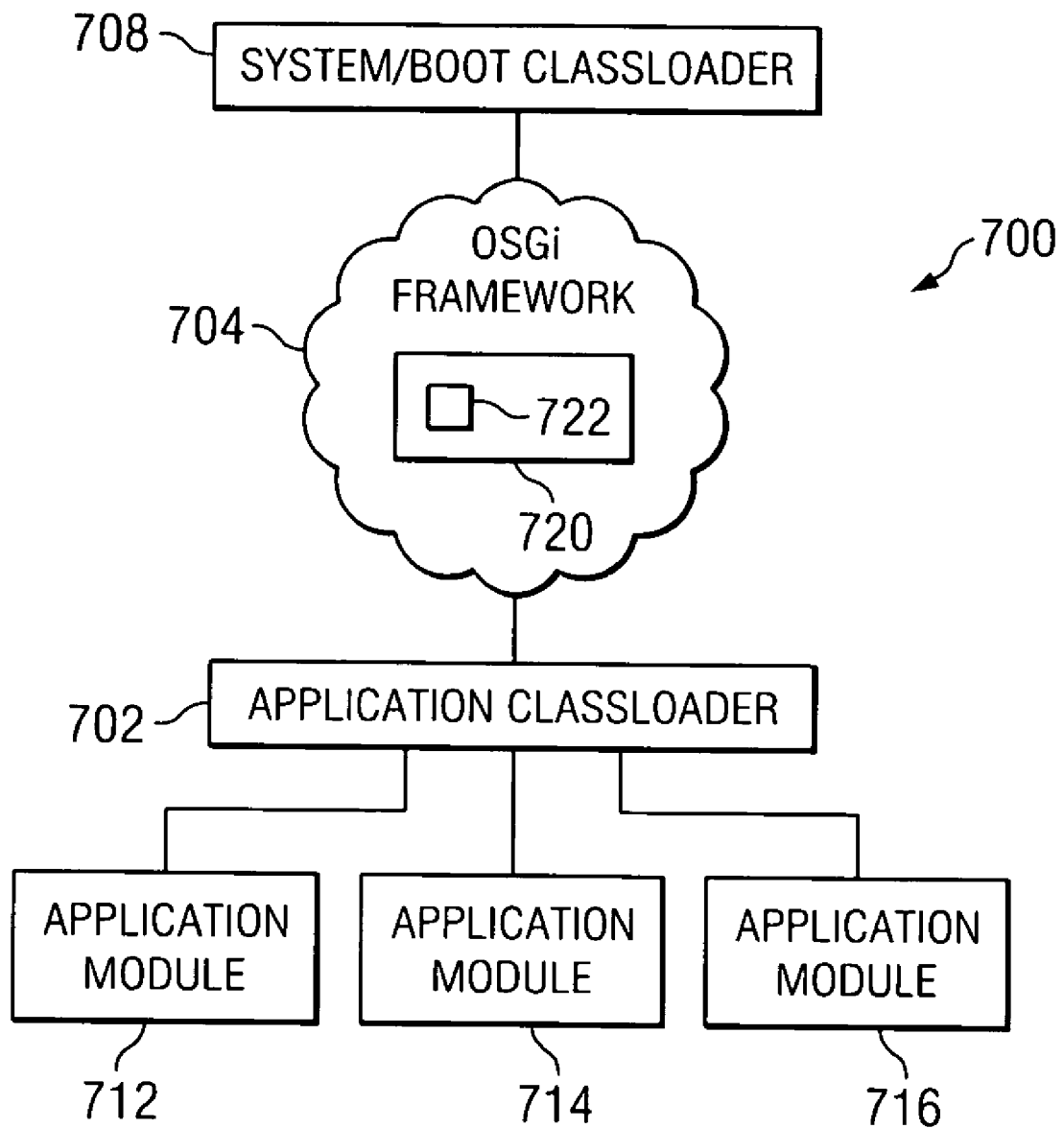
FIG. 7 is a block diagram that schematically illustrates a classloader system having both a hierarchical classloader architecture and a network classloader architecture according to an exemplary embodiment of the present invention.

FIG. 7 is a block diagram that schematically illustrates a classloader system having both a hierarchical classloader architecture and a network classloader architecture according to an exemplary embodiment of the present invention. The system is generally designated by reference number 700, and includes hierarchical tree classloader architecture that incorporates a network classloader architecture. The hierarchical classloader architecture is similar to classloader architecture 500 in FIG. 5, and includes Application classloader 702, possibly a plurality of Application Module classloaders 712, 714, 716, and a System/Bootstrap classloader 708 at the top of the hierarchy. System 700 differs from system 500, however, in that Runtime/Framework classloader in FIG. 5 is replaced by the OSGi cframework illustrated in FIG. 6.

In accordance with an exemplary embodiment of the present invention, this is achieved by defining a gateway bundle in the OSGi framework, designated by reference number 720, and incorporating a gateway classloader 722 in gateway bundle 720. Gateway bundle 720 dynamically imports, via gateway classloader 722, all the classes exported by all the other bundles in network classloader architecture, e.g., classes in bundles 602-608 in FIG. 6. More particularly, gateway bundle classloader 722, rather than requesting a specific class from a particular bundle in the OSGi network, in effect, requests all classes from all bundles in the network, thus establishing a connection with all classes in the network.

Furthermore, gateway bundle classloader 722 is set as a parent to Application classloader 702 in hierarchical classloader architecture 700. Accordingly, when a request for a class is received by Application classloader 702 from an application, unless the requested class is already cached by the Application classloader 702, the request will be forwarded to gateway bundle classloader 722.

According to an exemplary embodiment of the present invention, the bundle manifest (meta-data) of gateway bundle 720 includes the following:

Manifest-Version: 1.0
Bundle-Manifest Version: 2
Bundle-Name: ClassLoaderGateway
Bundle-Symbolic Name:
com.ibm.ws.runtime.gateway.singleton:=true
Bundle-Vendor: IBM
Bundle-Version: 1.0.0
DynamicImport-Package: *

The "*" symbol indicates that gateway bundle classloader 722 is interested in importing meta-data about any class in any bundle in the network.

According to an exemplary embodiment of the invention, therefore, when an application requests a runtime class, and the request is received by Application classloader 702) or one of Application module classloaders 712-716) it is forwarded up the hierarchy to System/Boot classloader 708 at the top of the hierarchy. If the request reaches the gateway bundle classloader, since gateway bundle classloader 722 can dynamically import all the classes exported by all other bundles in classloader network 704, the OSGi framework is, in effect, incorporated into the Java hierarchical framework so as to allow application to access classes exported from various bundles in the OSGi framework while retaining backward compatibility with existing Java-based applications.

According to an exemplary embodiment of the present invention, Application classloader 702 in the hierarchical classloader architecture need only recognize gateway bundle classloader 722 as a parent classloader. It need not know anything about the bundles in the network or their arrangement in the network. In other words, it need not know how a requested class is delivered to the gateway bundle classloader, only that it can be loaded from the gateway classloader.

Figure 8:
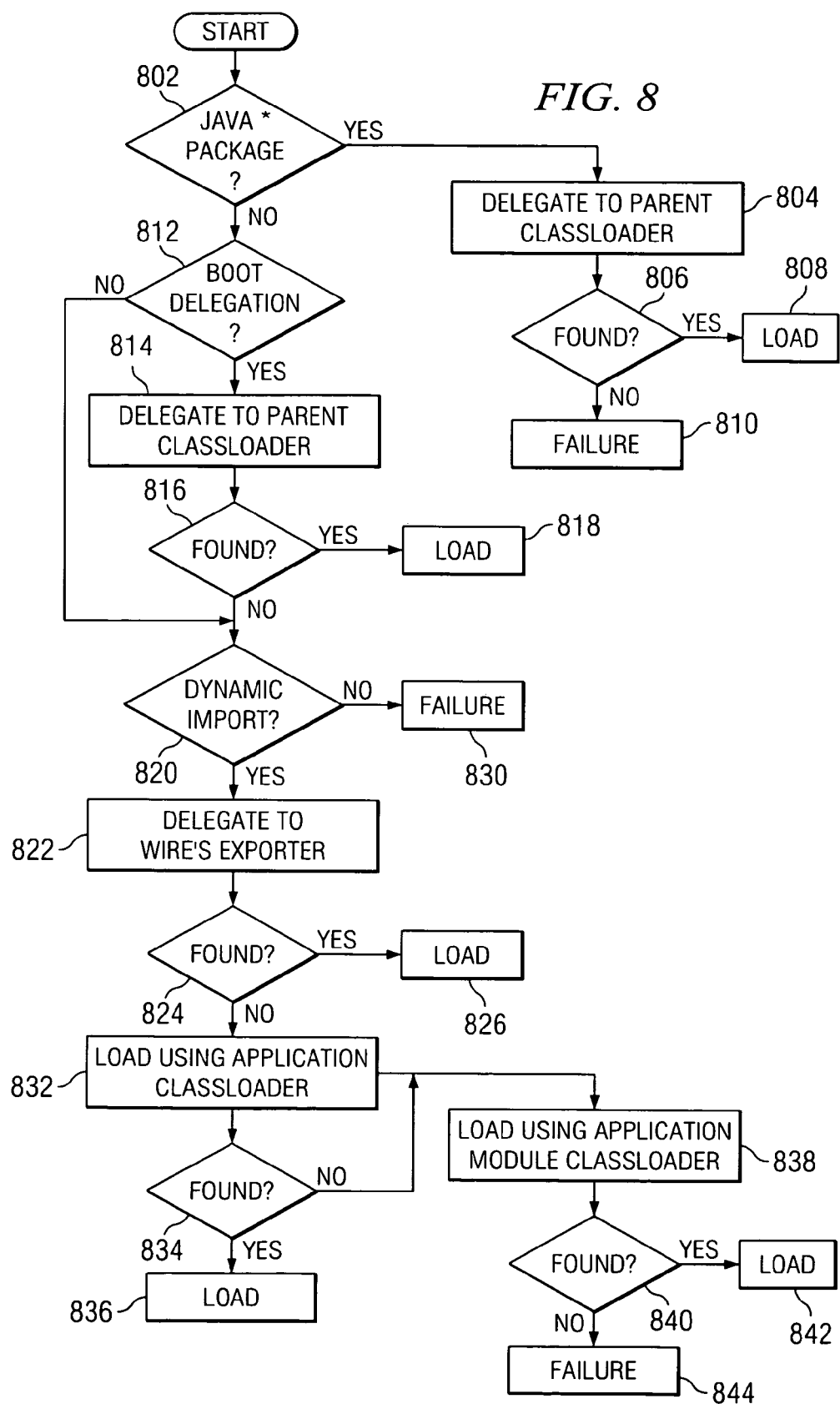
FIG. 8 is a flowchart that illustrates a method for searching for a class in a data processing system having classloaders organized in both a classloader hierarchy and a classloader network according to an exemplary embodiment of the present invention.

FIG. 8 is a flowchart that illustrates a method for searching for a class in a data processing system having classloaders organized in both a hierarchy and a network according to an exemplary embodiment of the present invention.

The method is generally designated by reference number 800, and begins by determining if a Java* package is returned (Step 802). If a Java* package is returned (Yes output of Step 802) a request is delegated to a parent classloader (Step 804). A determination is then made whether the requested class is found (Step 806). If it is found (Yes output of Step 806), the class is loaded )Step 808). If it is not found (No output of Step 808), there is a failure.

If the request is not for a Java* package (No output of Step 802), A determination is then made whether the request is for another package (Step 812) cached by the legacy extension classloader (Step 804). If the request is for another package (Yes output of Step 812), the request is delegated to a parent classloader in the package (Step 814). A determination is then made whether the requested class has been found (Step 816). If found (Yes output of Step 816), the class is loaded (Step 818). If the class is not found (No output of Step 816), the method goes to Step 820 to determine if there is a dynamic import in the OSGi framework (Step 820). If there is a dynamic import (Yes output of Step 820), the request is delegated to the exporting bundle in the network (Step 822), a determination is made whether the requested class is found (Step 824). If it is found (Yes output of Step 824), the class is loaded (Step 826). If it is not found (No output of Step 824), there is a failure in the search for the class in the network, and the method goes to Step 832 wherein the Application classloader attempts to load the class. A determination is made whether the requested class has been found (Step 834). If found (Yes output of Step 834), the requested class is loaded (Step 836). If not found, the method goes to Step 838 to wherein an Application module classloader attempts to locate the requested class. A determination is made whether the requested class is Found (Step 840). If found (Yes output of Step 840), the class is loaded (Step 842). If not found (no output of Step 840), a failure results and the method ends.

With the present invention, when gateway bundle classloader receives request to load a class for the first time, OSGi runtime will resolve the wiring of such class to an appropriate bundle. In addition, the wiring information is cached by the runtime, and used for subsequent class look-ups. This is a very efficient way to directly go to the exporting bundle.

In addition, each of the bundle classloaders in the network themselves typically will have a parent chain of classloaders, Framework classloader & a boot classloader. (e.g., Bundle CL→OSGi Framework CL→JVM boot classpath CL). Once the class wiring is established, the Gateway bundle will delegate the classload to a single exporting bundle. This bundle will delegate to its parent chain once before loading the class.

Also, the gateway bundle, being a bundle, is managed by OSGi runtime, and thus is in sync with the dynamic changes in the OSGi runtime environment such as when new bundles are started or existing bundles are stopped. This simplifies Gateway operation. Trying to achieve a similar effect through a custom classloader would require writing some specialized classloading code that may not be easy to keep in sync with the changes as OSGi specification and implementations evolve.

The present invention thus provides a computer implemented method, system and computer program product for searching for a class in a data processing system having classloaders organized in both a classloader hierarchy and a classloader network. A computer implemented method for searching for a class in a data processing system having classloaders organized in both a classloader hierarchy and a classloader network includes receiving a request to load a class at a request receiving classloader in the classloader hierarchy. The request to load a class is forwarded to a gateway classloader in the classloader network, wherein the gateway classloader is also in the classloader hierarchy. The requested class is then searched for in the classloader network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of searching for a class for loading into a data processing system, the computer-implemented method comprising:
    a processor defining a hierarchical classloader architecture for use in a data processing system, wherein the hierarchical classloader architecture comprises a runtime/framework classloader and an application classloader, wherein the runtime/framework classloader is a parent to the application classloader, and wherein a request for a class made to the application classloader is routed to the runtime/framework classloader before the application classloader searches for the class within its own scope;
    the processor refactoring classes that are supported by the runtime/framework classloader into bundles, wherein the bundles are units of modularized resources, wherein each bundle has a separate bundle classloader for accessing resources within the bundle, and wherein bundle classloaders communicate with one another in a network bundle architecture as peers rather than through a parent-child relationship found in the hierarchical classloader architecture;
    the processor establishing a gateway bundle classloader within a gateway bundle, wherein the gateway bundle comprises the bundles that have been refactored from the classes that were supported by the runtime/framework classloader, wherein the gateway bundle classloader is a parent to the application classloader, wherein the request for the class made to the application classloader is routed to the gateway bundle classloader before the application classloader searches for the class within its own scope;
    the processor receiving a request for a requested class, wherein the request is sent from the application classloader to the gateway bundle classloader in response to the application classloader receiving the request from an application; and
    the processor transmitting the requested class from the gateway bundle classloader to the application classloader for loading into the data processing system.

2. The computer-implemented method of claim 1, wherein the gateway bundle classloader requests all bundles from the network bundles rather than requesting a specific class from a particular network bundle in order to establish a connection with all classes in the network.

3. The computer-implemented method of claim 1, wherein the gateway bundle is a component of an Open Services Gateway Initiative (OSGi) network.

4. The computer-implemented method of claim 1, further comprising:
    configuring the application classloader to recognize the gateway bundle classloader as a parent classloader, wherein the application classloader is unaware of an arrangement of bundles in the network.

5. A computer program product for searching for a class for loading into a data processing system, the computer program product comprising:
    a computer readable storage media;
    first program instructions to define a hierarchical classloader architecture for use in a data processing system, wherein the hierarchical classloader architecture comprises a runtime/framework classloader and an application classloader, wherein the runtime/framework classloader is a parent to the application classloader, and wherein a request for a class made to the application classloader is routed to the runtime/framework classloader before the application classloader searches for the class within its own scope;
    second program instructions to refactor classes that are supported by the runtime/framework classloader into bundles, wherein the bundles are units of modularized resources, wherein each bundle has a separate bundle classloader for accessing resources within the bundle, and wherein bundle classloaders communicate with one another in a network bundle architecture as peers rather than through a parent-child relationship found in the hierarchical classloader architecture;
    third program instructions to establish a gateway bundle classloader within a gateway bundle, wherein the gateway bundle comprises the bundles that have been refactored from the classes that were supported by the runtime/framework classloader, wherein the gateway bundle classloader is a parent to the application classloader, wherein the request for the class made to the application classloader is routed to the gateway bundle classloader before the application classloader searches for the class within its own scope;
    fourth program instructions to receive a request for a requested class, wherein the request is sent from the application classloader to the gateway bundle classloader in response to the application classloader receiving the request from an application; and
    fifth program instructions to transmit the requested class from the gateway bundle classloader to the application classloader for loading into the data processing system;
    and wherein
    the first, second, third, fourth, and fifth program instructions are stored on the computer readable storage media.

6. The computer program product of claim 5, wherein the gateway bundle classloader requests all bundles from the network bundles rather than requesting a specific class from a particular network bundle in order to establish a connection with all classes in the network.

7. The computer program product of claim 5, wherein the gateway bundle is a component of an Open Services Gateway Initiative (OSGi) network.

8. The computer program product of claim 5, further comprising:
sixth program instructions to configure the application classloader to recognize the gateway bundle classloader as a parent classloader, wherein the application classloader is unaware of an arrangement of bundles in the network; and wherein
the sixth program instructions are stored on the computer readable storage media.

9. A computer system comprising:
a processor, a computer readable memory, and a computer readable storage media;
first program instructions to define a hierarchical classloader architecture for use in a data processing system, wherein the hierarchical classloader architecture comprises a runtime/framework classloader and an application classloader, wherein the runtime/framework classloader is a parent to the application classloader, and wherein a request for a class made to the application classloader is routed to the runtime/framework classloader before the application classloader searches for the class within its own scope;
second program instructions to refactor classes that are supported by the runtime/framework classloader into bundles, wherein the bundles are units of modularized resources, wherein each bundle has a separate bundle classloader for accessing resources within the bundle, and wherein bundle classloaders communicate with one another in a network bundle architecture as peers rather than through a parent-child relationship found in the hierarchical classloader architecture;
third program instructions to establish a gateway bundle classloader within a gateway bundle, wherein the gateway bundle comprises the bundles that have been refactored from the classes that were supported by the runtime/framework classloader, wherein the gateway bundle classloader is a parent to the application classloader, wherein the request for the class made to the application classloader is routed to the gateway bundle classloader before the application classloader searches for the class within its own scope;
fourth program instructions to receive a request for a requested class, wherein the request is sent from the application classloader to the gateway bundle classloader in response to the application classloader receiving the request from an application; and
fifth program instructions to transmit the requested class from the gateway bundle classloader to the application classloader for loading into the data processing system; and wherein
the first, second, third, fourth, and fifth program instructions are stored on the computer readable storage media for execution by the processor via the computer readable memory.

10. The computer system of claim 9, wherein the gateway bundle classloader requests all bundles from the network bundles rather than requesting a specific class from a particular network bundle in order to establish a connection with all classes in the network.

11. The computer system of claim 9, wherein the gateway bundle is a component of an Open Services Gateway Initiative (OSGi) network.

12. The computer system of claim 9, further comprising:
sixth program instructions to configure the application classloader to recognize the gateway bundle classloader as a parent classloader, wherein the application classloader is unaware of an arrangement of bundles in the network; and wherein
the sixth program instructions are stored on the computer readable storage media for execution by the processor via the computer readable memory.

* * * * *